United States Patent [19]

Kaneko

[11] Patent Number: 4,920,371
[45] Date of Patent: Apr. 24, 1990

[54] CAMERA CONTROL DEVICE

[75] Inventor: Kiyotaka Kaneko, Tokyo, Japan

[73] Assignee: Fuji Photo Film Co., Ltd., Kanagawa, Japan

[21] Appl. No.: 187,039

[22] Filed: Apr. 27, 1988

[30] Foreign Application Priority Data

| Apr. 27, 1987 | [JP] | Japan | 62-101989 |
| May 6, 1987 | [JP] | Japan | 62-108859 |
| May 8, 1987 | [JP] | Japan | 62-110834 |

[51] Int. Cl.⁵ .............................................. G03B 7/00
[52] U.S. Cl. .................................... 354/410; 354/412; 354/76; 354/110; 358/909
[58] Field of Search ............... 354/412, 410, 75, 76, 354/105, 106, 113, 110; 358/909

[56] References Cited

U.S. PATENT DOCUMENTS

| 4,618,239 | 10/1986 | Sakamoto | 354/76 |
| 4,689,696 | 8/1987 | Plummer | 358/909 |
| 4,738,526 | 4/1988 | Larish | 354/76 |
| 4,742,369 | 5/1988 | Ishii et al. | 354/76 |

FOREIGN PATENT DOCUMENTS

| 0091640 | 5/1986 | Japan | 354/76 |

Primary Examiner—Russell E. Adams
Attorney, Agent, or Firm—Birch, Stewart, Kolasch & Birch

[57] ABSTRACT

A camera control device connected with an electronic still camera, a master camera and a strobo device, in which the shutter release operation of both camera is controlled so that, when a release switch of the camera control device is turned on, shutters of the electronic still camera and the master camera open, and the strobo device is caused to emit light while both shutters are opened.

3 Claims, 9 Drawing Sheets

CAMERA CONTROL DEVICE

BACKGROUND OF THE INVENTION

This invention relates to a camera control device which allows simultaneous photographing operations of an electronic still camera (hereinafter referred to as "ES camera") and a master camera in synchronism with light emission of a strobo device.

To take professional and commercial photographs at studios, interchangeable lens type, large-size cameras with 120 mm or 220 mm roll films or sheet films are generally used. In studio photography, when photographing a still life subject, the resulting photograph is exactly as viewed through the view finder of the camera. However, when photographing a moving subject, for example, to make a portrait, the resulting picture image on the film cannot be confirmed at photographing by looking through the viewfinder. Therefore, a plurality of photographs with different shooting angels and poses have to be made and, after development, a suitable one must be selected from them, which can then be enlarged.

As described above, in making a portrait using a large-size camera, for example, when a client goes to a studio to make a photograph, the photographic images cannot be confirmed a the time of photographing. A plurality of photographs have to be prepared and the one to be enlarged is selected by the client of a later date. The selected on is then enlarged. Therefore, the client must go the studio several times, requiring substantial labor, time and unconvenience.

If, in making a portrait using a large-size camera, an instant camera is set up at the same time, the photograph to be taken can be seen immediately. Since, however, in the studio the large-size camera uses a strobo device which emits light in synchronism with the shutter release of the large-size camera, the instant camera cannot operate synchronism with the strobo device, and an instant photograph with the same timing as the large-size camera cannot be taken.

Further, there has recently been commercialized an ES camera, in which the image is electrically photographed and recorded on a magnetic recording medium, which can be instantly reproduced by a reproduction device. However, if the ES camera is set up with the large-size camera, it cannot be operated synchronously with the light emission of the strobo device of the large-size camera, as in the case of the instant camera.

With a view to obviate all of the above-described prior art defects, it is a primary object of the present invention to provide a camera control device which allows photographing operation of a master camera and an ES camera at the same timing synchronously with the strobo light emission of a strobo device.

SUMMARY OF THE INVENTION

In accordance with the present invention which attains the above object, there is provided a first camera control device in which, when a release switch is turned on, a shutter release operation is simultaneously made for a master camera and an ES camera to fully open the shutters of the master camera and the ES camera, and when respective shutter full-open signals are inputted, a strobo sync signal is outputted to cause a strobo device to emit light, thereby operating the master camera and the ES camera with the same timing.

There is also provided according to the present invention a second camera control device in which, when a release switch is turned on, an ES camera shutter set to a bulb position is released and then in response to on a shutter full-close signal a master camera shutter is released. A strobo device is operated by a strobo sync signal outputted from the master camera, a signal is outputted so that the ES camera shutter is closed according to a strobo lighting completion signal, to thereby operate the ES camera synchronously with the light emission of the strobo device.

There is further provided according to the present invention a third camera control device in which, when a release switch is turned on, a signal is outputted so that an ES camera shutter set to a bulb position is opened and a signal is outputted to cause a shutter release so that a master camera shutter is opened after a predetermined delay time and, when a strobo device is operated to emit light by a strobo sync signal outputted from the master camera, a signal is outputted to close the ES camera shutter, thereby operating the ES camera synchronously with the light emission of the strobo device.

DESCRIPTION OF THE PREFERRED EMBODIMENTS Embodiment 1

Figure 1:
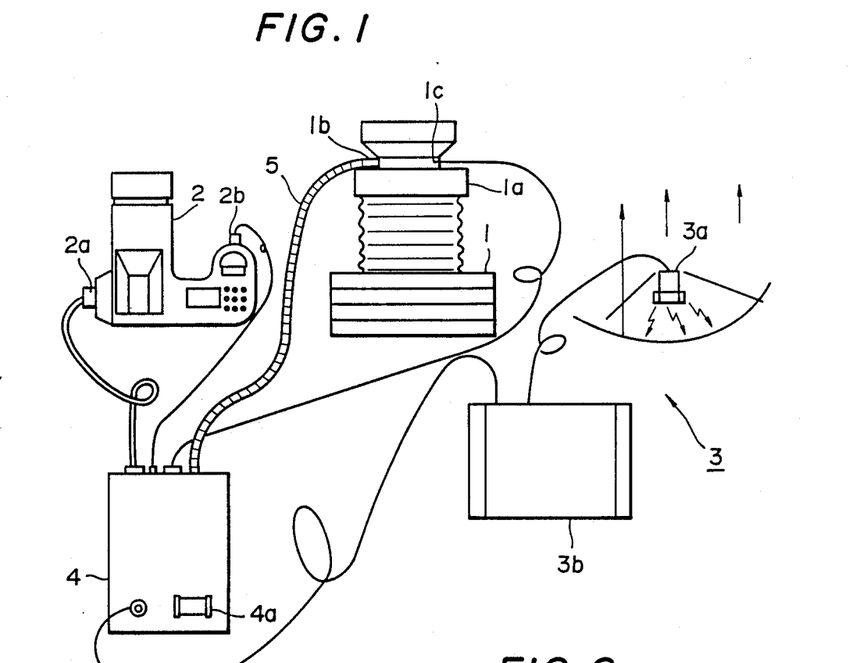
FIG. 1 is a schematic view showing the structure of a first embodiment of the present invention.
Figure 2:
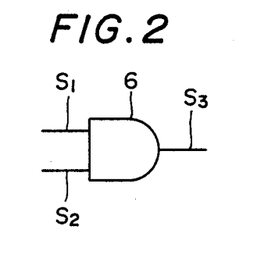
FIG. 2 is a schematic view showing part of the first embodiment of the present invention.

FIG. 1 is a schematic view showing a first embodiment of the present invention. Referring to FIG. 1, numeral 1 indicates a large-size camera equipped with a lens shutter 1a which is mainly used by the operator, numeral 2 indicates an electronic still (ES) camera disposed close to the large-size camera 1 and directed in the same direction as the large-size camera 1. The large-size camera and the ES camera, when the shutters are fully opened, respectively output shutter full-open signals, that is, strobo sync signals (XON). The ES camera electrically photographs and records still picture information on a magnetic disk 4.7 mm in diameter known as a still video floppy (containing 50 frames per disk). Numeral 3 indicates a strobo device comprising a light emitting unit 3a and a main unit 3b numeral 4 is a camera control device which causes the strobo device to emit light in synchronism with the full opening of the shutters of the large-size camera and the ES camera. The camera control device is electrically connected with a shutter release terminal 2a of the ES camera 2 and the main unit 3b of the strobo device 3, and is mechanically connected with a shutter release terminal 1b of the large-size camera 1 through a cable release 5. Strobo sync signals (XON) $S_1$ and $S_2$ outputted respectively from sync contacts (X contacts) 1c and 2b of the large-size camera 1 and the ES camera 2 are inputted to an AND gate 6 in the camera control device 4 (FIG. 2). Numeral 4a indicates a release switch to release both shutters of the large-size camera and the ES camera. Photographing by this embodiment is performed under strobo light emission of the strobo device 3 in a studio, and the studio lighting is dimmed during photographing.

Figure 3:
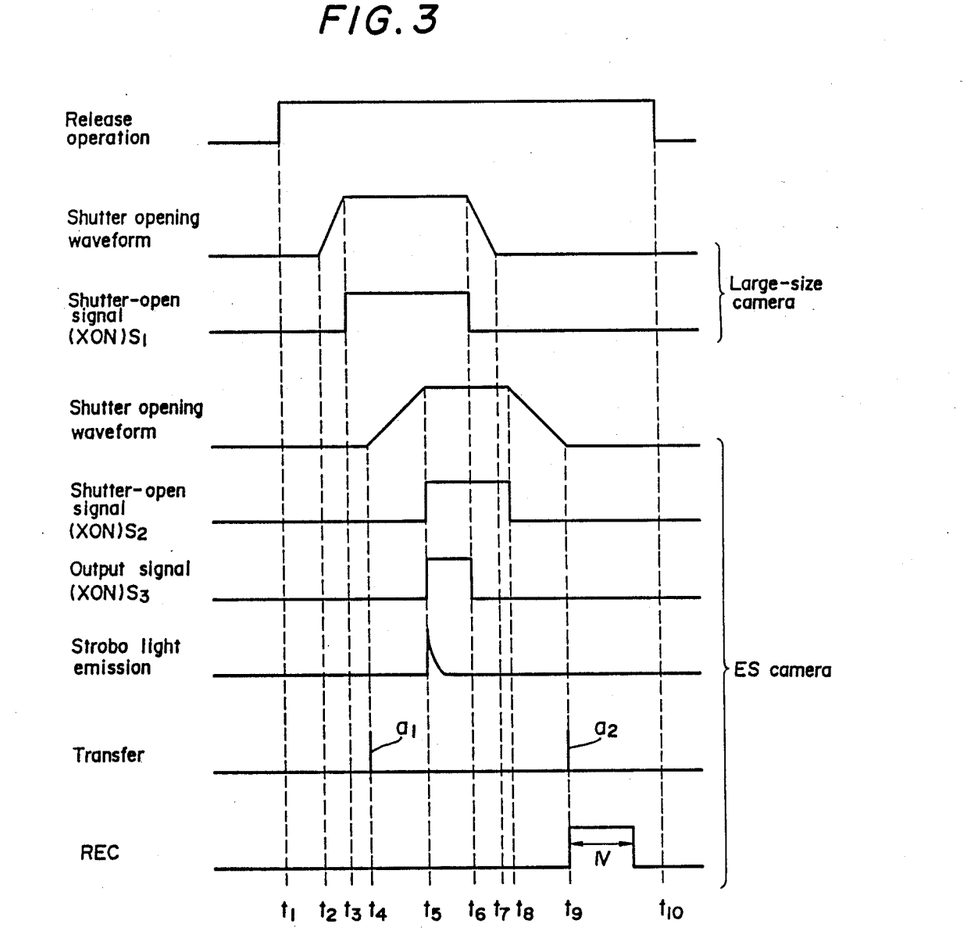
FIG. 3 is a time chart showing the operation of the first embodiment of the present invention.

Operation of this embodiment will now be described with reference to FIG. 1 and FIG. 2, and FIG. 3 which is a time chart showing the operation. The large-size camera 1 which is set to a predetermined shutter speed (a little slower than that for the ES camera) and aperture, the ES camera 2 is set to a predetermined shutter speed and aperture, and the light emitting unit 3a of the strobo device 3 is set to a subject (not shown) such as a person. When the release switch 4a of the camera control device 4 is turned on at time $t_1$, the large-size camera 1 makes a shutter release through the cable release 5 and, after a certain mechanical delay (from time $t_1$ to time $t_2$), the shutter 1a is fully opened at time $t_3$. when the release switch 4a is turned on, a shutter release of the ES camera 2 is made simultaneously at time $t_1$ and, after a certain mechanical delay (from time $t_1$ to time $t_4$), the shutter is fully opened at time $t_5$. The large-size camera 1 at time $t_3$ outputs the strobo sync signal (XON) $S_1$, which is a shutter full-open signal, from the sync terminal 1c to the AND gate 6 in the camera control device 4, and the ES camera 2 at time $t_5$ outputs the strobo sync signal (XON) $S_2$, which is a shutter full-open signal, from the sync terminal 2b to the AND gate 6 in the camera control device 4. When the AND gate 6 is inputted with the XON signals $S_1$ and $S_2$ from the large-sized camera 1 and the ES camera 2, an output signal $S_3$ is outputted. At this moment, the output signal $S_3$ from the AND gate is inputted to the main unit 3b of the strobo device 3, the light emitting unit 3b operates to emit light. Since, at this moment, both shutters of the large-sized camera 1 and the ES camera 2 are fully opened, the large-size camera 1 and the ES camera 2 operate to perform photographing synchronously with the strobo light emission. Thus, the output signal $S_3$ outputted from the AND gate 6 acts as a strobo sync signal (XON) which causes the strobo device 3 to emit strobo light. After the lapse of a predetermined shutter time from the strobo light emission of the strobo device 3 and a mechanical delay time, the shutter 1a of the large-size camera 1 begins to close at time $t_6$, with the XON signal $s_1$ changing state to OFF, the output signal $S_3$ goes OFF, and the shutter 1a is closed at time $t_7$. After the strobo light emission of the strobo device 3 and the lapse of a predetermined shutter time and a mechanical delay, The ES camera 1 begins at time $t_8$ to close its shutter and the XON signal $S_2$ goes OFF, and the shutter is closed at time $t_9$. After the shutter of the ES camera is closed at time $t_9$, the camera system is set up for the next shot.

Photographing and recording operations of the ES camera 2 will now be described. The ES camera 2 focuses an optical image incident through its lens system onto a CCD as an imaging element, and a picture signal from the CCD is processed in a processing circuit and recorded on a magnetic disk through a recording circuit. At this time, to discharge electrical charges which have been accumulated on the CCD, a clear signal $a_1$ is outputted at the rising edge of the shutter opening waveform by the commencement of shutter opening (time $t_4$) of the ES camera 2 to perform photographing by the strobo light emission of the strobo device 3. After the falling edge of the shutter opening waveform at the shutter closing (time $t_9$), a transfer signal $a_2$ is outputted to perform predetermined processing in a photographing signal processing circuit (not shown) and to record a picture signal of one vertical scanning period (1V) on the magnetic disk. The picture recorded on the magnetic disk can be displayed immediately on a television screen by a reproduction device.

In the above-described embodiment, the ES camera which outputs the shutter full-open signal is used as a first camera. However, the first camera is not restricted to an ES camera, but any other camera that can output the shutter full-open signal can be used in the present invention.

As described above, with the first embodiment of the present invention, the ES camera is operated to photograph synchronously with the strobo light emission of the strobo device of the master camera, thereby immediately obtaining a photograph with the same timing as the master camera.

Embodiment 2

Figure 4:
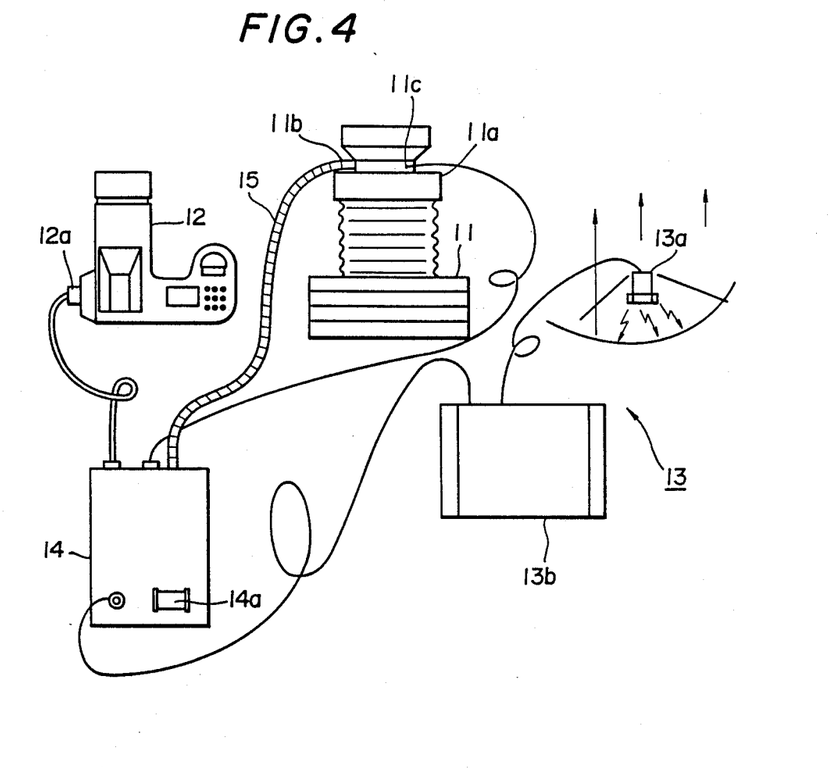
FIG. 4 is a schematic view showing the structure of a second embodiment of the present invention.

FIG. 4 is a schematic view showing the structure of a second embodiment of the present invention. Referring to FIG. 4, numeral 11 indicates a large-size camera equipped with a mechanically-controlled lens shutter 11a which is mainly used by the operator and numeral 12 indicates an ES camera which outputs a shutter full-close signal (a signal indicating the beginning the opening of shutter). The ES camera is disposed close to the large-size camera and is directed in the same direction as the large-size camera. Numeral 13 indicates a strobo device comprising a light emitting unit 13a and a main unit 13b, which emits light in response to a strobo sync signal (XON) from a sync contact (X contact) 11c of the large-size camera 11. Numeral 14 indicates a camera control device which synchronizes the shutter release of the ES camera with the light emission of the strobo device 13 of the large-size camera 11. The camera control device 14 is electrically connected with a shutter release terminal 12a of the ES camera 12 and the main unit 13b of the strobo device 13, and is mechanically connected with a shutter release terminal 11b of the large-size camera 11 through a cable release 15. control device 14 is inputted with the strobo sync signal (XON) from the sync contact (X contact) of the large-size camera 11. Operation of a release switch 14a provided in the camera control device 14, a shutter-open operation of the large-size camera 11, an open/close operation of the shutter (focal-plane shutter) of the ES camera 12, and strobo light emission are controlled by a CPU (not shown) in the camera control device 14. Photographing operation using this embodiment is performed in a studio under strobo light emission of the strobo device 13, and the studio lighting is dimmed during photographing.

Figure 5:
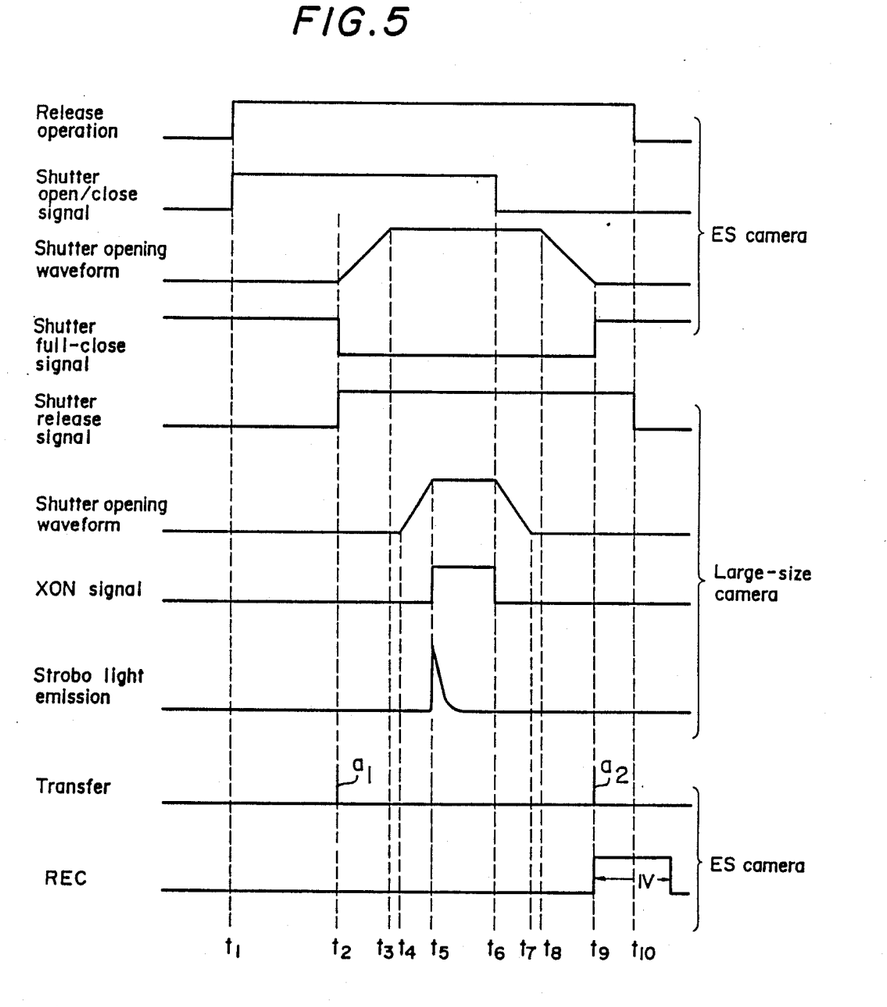
FIG. 5 is a time chart showing the operation of the second embodiment of the present invention.
Figure 6:
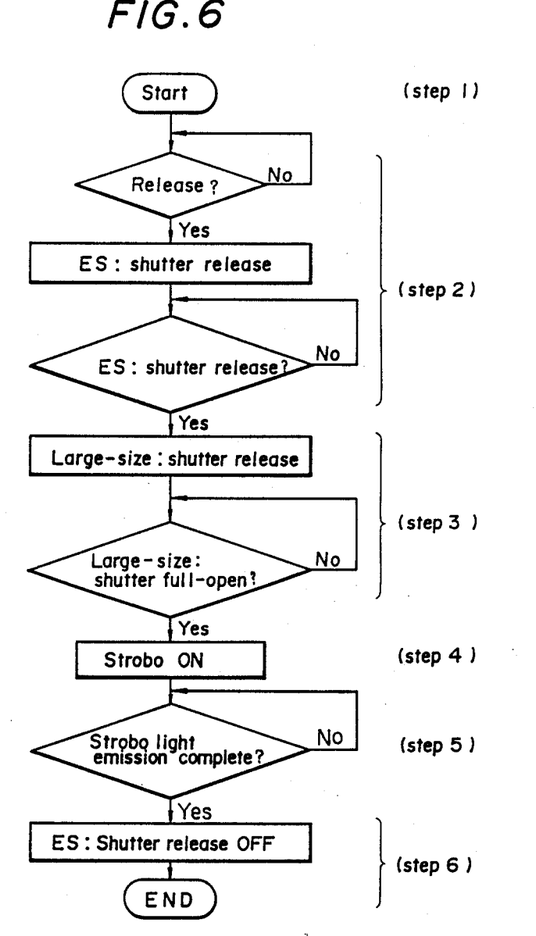
FIG. 6 is a flow chart showing the operation of the second embodiment of the present invention.

Operation of this embodiment will now be described with reference to FIG. 4, FIG. 5 which is a time chart showing the operation, and FIG. 6 which is a flow chart. The large-size camera 11 which is set to predetermined shutter speed and a aperture, the ES camera 12 with the shutter speed set to a bulb position and the aperture set to a predetermined value, and the light emitting unit 13a of the strobo device 13 are set to a subject (not shown) such as a person (step 1). When the release switch 14a of the camera control device 4 is turned on at time $t_1$, a shutter-open signal is outputted in in response to the instruction of the CPU to the ES camera 12 to make a shutter release, the aperture is adjusted during the period from time $t_1$ to time $t_2$, a mirror-up action is carried out, and then the shutter is fully opened at time $t_3$ (step 2). The camera control device 14, according to the falling edge of a shutter full-close signal inputted at time $t_2$ from the ES camera 12 through the shutter release terminal 12a, outputs a shutter release signal to the large-sized camera 11 to make shutter release through the cable release 15 and, after a mechanical delay (period from time $t_2$ to time $t_4$), the shutter 11a is fully opened at time $t_5$ (step 3). When the shutter 11a is fully opened at time $t_5$, a strobo sync signal (XON) is inputted from the X contact 11c to the strobo sync device 13 and the light emitting unit 13a emits light according to the XON signal inputted (step 4). Since, at this moment, the shutters of the large-size camera 11 and the ES camera 12 are fully opened, the large-size camera 11 and the ES camera 12 perform a photographing operation synchronously with the strobo light emission. After the strobo light emission of the strobo device 13 and the lapse of a predetermined shutter time, at time $t_6$ the shutter 11a of the large-size camera begins to close, the XON signal goes OFF, and the shutter 11a is closed at time $t_7$ (step 5). Then, the camera control device 14 at the falling edge of the XON signal at time $t_6$, that is, when a strobo light emission completion signal is inputted, outputs a shutter close signal to the ES camera 12. The ES Camera 12, after a mechanical delay, begins to close the shutter at time $t_8$, which is fully closed at time $t_9$, and the shutter full-close signal goes high (step 6). After the shutter 11a of the large-size camera 11 is closed at time $t_7$, the shutter release signal goes OFF and the release switch 14a is released to prepare for the next photographing operation.

Photographing and recording operations with the ES camera 12 will now be described. For recording, to discharge electrical charges which have been accumulated on the CCD, a clear signal $a_1$ is outputted at the falling edge of the shutter full-close signal by the commencement of shutter opening (time $t_2$) of the ES camera 12 to perform photographing by the strobo light emission of the strobo sync device 13. At the rising edge of the shutter full-close signal at the shutter closing (time $t_9$), a transfer signal $a_2$ is outputted to perform predetermined processing in a photographing signal processing circuit (not shown) and to record a picture signal of one vertical scanning period (1V) on the magnetic disk. The picture recorded on the magnetic disk can be displayed immediately on a television screen by a reproduction device.

In the above-described embodiment, the ES camera which outputs the shutter full-close signal is used as a first camera. However, the first camera is not restricted to an ES camera, but any other camera that can output the shutter full-close signal can be used in the present invention.

As described above, with the second embodiment of the present invention, the ES camera is operated to photograph synchronously with the strobo light emission of the strobo device of the master camera, thereby immediately obtaining a photograph with the same timing as the master camera.

Embodiment 3

Figure 7:
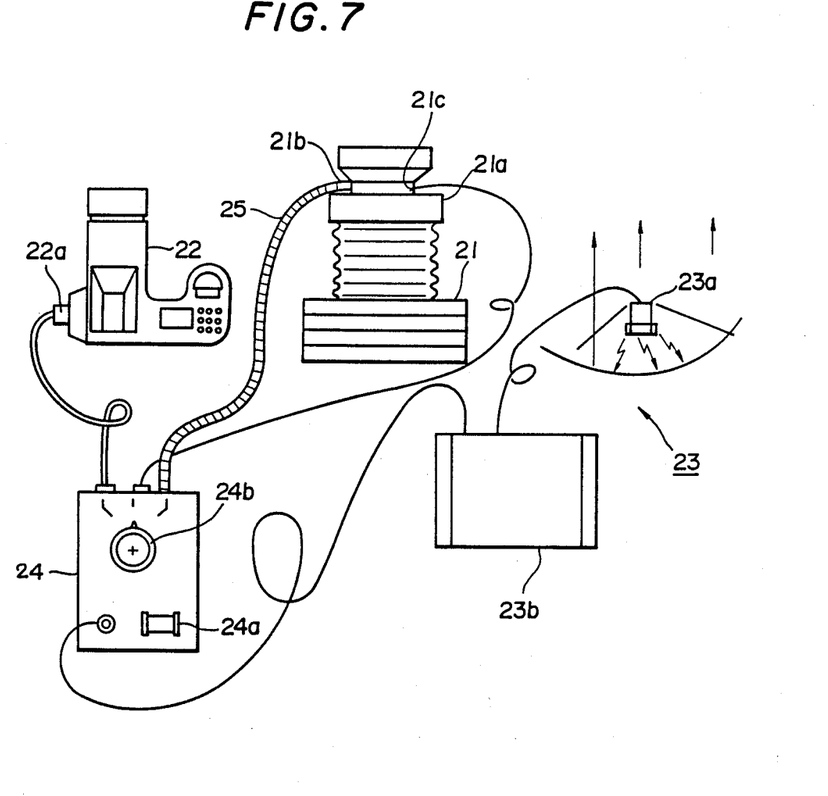
FIG. 7 is a schematic view showing a third embodiment of the present invention.
Figure 8:
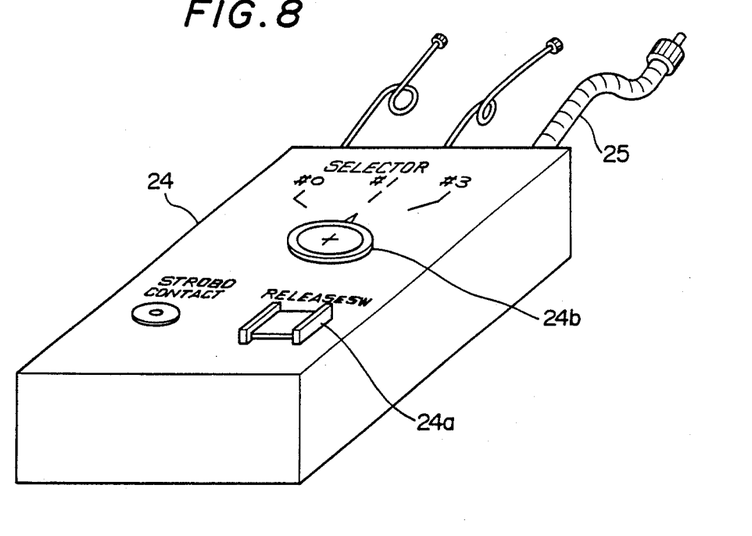
FIG. 8 is a schematic perspective view showing a strobo synchronizing device of the third embodiment according to the present invention.
Figure 9:
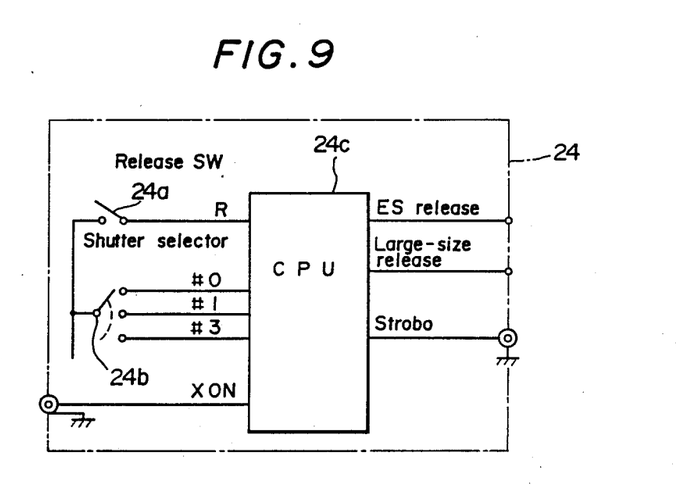
FIG. 9 is a schematic view showing a signal system of the strobo synchronizing device of the third embodiment according to the present invention.

FIG. 7 is a schematic view showing a third embodiment of the present invention. Referring to FIG. 7, numeral 21 indicates a large-size camera as a master camera, which uses a silver salt film, equipped with a mechanically-controlled lens shutter 21a, and numeral 22 indicates an ES camera disposed close to the large size camera 21 and directed in the same direction as the large-size camera 21. Numeral 23 indicates a strobo device comprising a light emitting unit 23a and a main unit 23b, which emits light by a strobo sync signal (XON) from a sync contact 21c (X contact) of the large-size camera. Numeral 24 indicates a camera control device which synchronizes the shutter release of the ES camera 22 with the light emission of the strobo device 23 of the large-size camera 21 (FIG. 8). The camera control device 24 has a shutter selector 24b which selects a shutter size (#0, #1, or #3 in the figure) of the lens shutter 21a, Further, the camera control device 24 is electrically connected with a shutter release terminal 22a of the ES camera 22 and the main unit 23b of the strobo device 23, and is mechanically connected with a shutter release terminal 21b of the large-size camera 21 through a cable release 25, and is inputted with a strobo sync signal (XON) from the sync contact 21c (X contact) of the large-size camera. Operation of the release switch 24a and the shutter selector 24b, shutter-open operation of the large-size camera 21, open/close operation of the shutter (focal-plane shutter) of the ES camera 22, and strobo light emission are controlled by a CPU 24c (shown in FIG. 9), in the camera control device 24.

Figure 10:
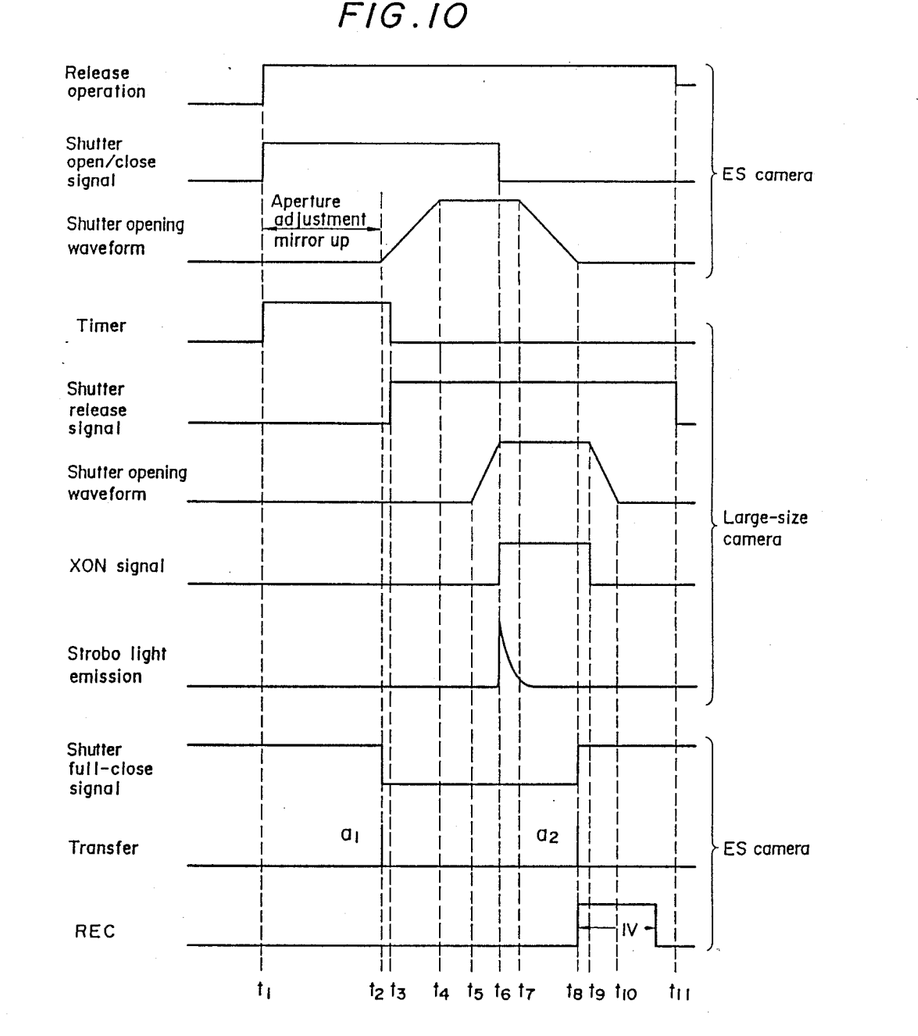
FIG. 10 is a time chart showing the operation of the third embodiment of the present invention.
Figure 11:
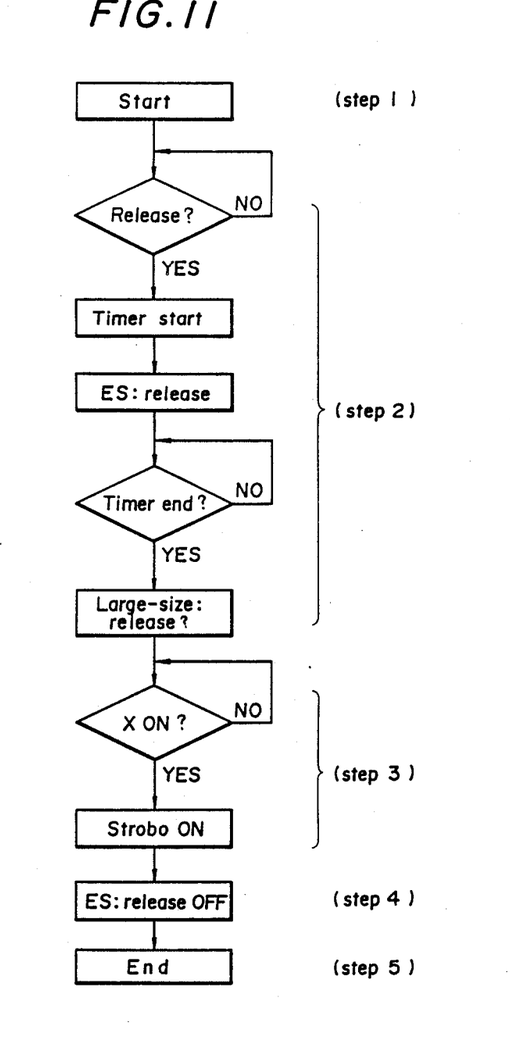
FIG. 11 is a flow chart showing the operation of the third embodiment of the present invention.

Operation of this embodiment will now be described with reference to FIGS. 7 to 9, FIG. 10 which is a time chart showing operation conditions, and FIG. 11 which is a flow chart. The large-size camera 21 which is set to a predetermined shutter speed and aperture, the ES camera 22 with the shutter speed set to a bulb position and the aperture set to a predetermined value, and the light emitting unit 23a of the strobo device 23 are set to a subject (not shown) such as a person (step 1). When the release switch 24a of the camera control device 24 is turned on at time $t_1$, a shutter-open signal is outputted in response to the instruction of the CPU 24c to the ES camera 12, and a timer operates until time $t_3$ at which a shutter release signal is outputted to the large-size camera 21 to begin shutter opening operation through the cable release 25. The timer operation time from time $t_1$ to time $t_3$ is set by the shutter selector 24b in dependence on the size of the lens shutter 21a of the large-size camera 21, being set to a shorter time for a larger shutter diameter, but longer than that for controlling the aperture and the mirror-up operation (period from time $t_1$ to time $t_2$) of the ES camera 22. In the ES camera 22, the aperture is adjusted during the period from time $t_1$ to time $t_2$ and, after mirror-up operation, the shutter is fully opened at time $t_4$. In the large-size camera 21, after a mechanical delay (period from time $t_3$ to time $t_5$), the lens shutter 21a is fully opened at time $t_6$. At almost the same time the lens shutter 21a of the large-size camera 21 is fully openings, a strobo sync signal (XON) is inputted to the camera control device 24, in response to which the light emitting unit 23a of the strobo device 23 emits light (step 3). At this moment, since the shutters of the large-size camera 21 and the ES camera 22 are fully opened, the large-size camera 21 and the ES camera 22 operate to photograph synchronously with the strobo light emission. The camera control device 24, when inputted with the XON signal at time $t_6$, outputs a shutter-close signal to the ES camera 22, and the ES camera 22, after a mechanical delay, begins to close the shutter at time $t_7$, which is fully closed at time $t_8$ (step 4). The large-sized camera 21, after the lapse of a predetermined shutter time, begins to close the shutter at time $t_9$, the XON signal goes OFF, the shutter is closed at time $t_{10}$, and at time $t_{11}$ the shutter release signal goes OFF and the release switch 24a is released to prepare for the next photographing operation (step 5).

Photographing and recording operations with the ES camera 22 will now be described. The ES camera 2 focuses an optical image incident through its lens system onto a CCD as an imaging element, and a picture signal from the CCD is processed in a processing circuit and recorded on a magnetic disk through a recording circuit.

To discharge electrical charges which have been accumulated on the CCD of the ES camera 22, a clear signal $a_1$ is outputted at the falling edge of the shutter full-close signal by the commencement of shutter opening (time $t_2$) of the ES camera 22 to perform photographing by the strobo light emission under a control of the camera control device 24. After the rising edge of of the shutter full-close signal at the shutter closing (time $t_8$), a transfer signal $a_2$ is outputted to perform predetermined processing in a photographing signal processing circuit (not shown) and to record a picture signal of one vertical scanning period (1V) on the magnetic disk. The picture recorded on a magnetic disk can be displayed immediately on a television screen by a reproduction device.

The above-described embodiment uses the large-size camera having a mechanically-controlled lens shutter but, alternatively, a large-sized camera having an electronically-controlled lens shutter or a medium-size camera having a focal-plane shutter may be used. In this case, since the medium-size camera requires adjustment of aperture and mirror-up action, the timer operation time ($t_1 - t_3$) is reduced.

As described above, with this embodiment of the present invention, the ES camera is operated to photograph synchronously with strobo light emission of the strobo device of the large-size camera as a master camera, thereby immediately obtaining a photograph with the same timing as the large-size camera.

I claim:

1. A camera control device for controlling the shutter release operations of a master camera and an electronic still camera to be synchronous with emission of a strobo light from a strobo device, comprising:
   a shutter release switch for controlling the opening of shutters of said master camera and said electronic still camera when actuated;
   means for receiving a shutter full-open signal from said master camera and said electronic still camera when their shutters are respectively fully opened and outputting a strobo sync signal when both shutter full-open signals coincide; and
   means for supplying said strobo sync signal to said strobo device to cause emission of said strobo light.

2. A camera control device for controlling the shutter release operations of a master camera and an electronic still camera to be synchronous with emission of a strobo light from a strobo device, comprising:
   a shutter release switch for controlling the opening of a shutter of said electronic still camera;
   means for receiving a shutter full-close signal from said electronic still camera when said shutter is fully closed and outputting a shutter release signal to said master camera in the absence of said shutter full-close signal to open a shutter of said master camera;
   means for receiving a strobo sync signal from said master camera when the shutter thereof is fully opened and developing a strobe output signal in response thereto applied to said strobo device to cause emission of said strobo light; and
   means for outputting a signal to said electronic still camera to close the shutter thereof upon completion of strobe emission.

3. A camera control device for controlling the shutter release operations of a master camera and an electronic still camera to be synchronous with emission of a strobo light from a strobo device, comprising:
   a timer;
   a shutter release switch for controlling the opening of a shutter of said electronic still camera and the operation of said timer;
   said timer outputting a shutter release signal to said master camera a predetermined time period after being operated by said shutter release switch to open a shutter of said master camera;
   means for receiving a strobo sync signal from said master camera when the shutter thereof is fuly opened and developing a strobe output signal in response thereto applied to said strobo device to cause strobe light emission; and
   means for outputting a signal to said electronic still camera to close the shutter thereof upon completion of strobe emission.

* * * * *